(12) United States Patent
Xu et al.

(10) Patent No.: US 9,516,533 B2
(45) Date of Patent: Dec. 6, 2016

(54) METHOD FOR REPORTING RADIO LINK FAILURE INFORMATION

(71) Applicant: Samsung Electronics Co., Ltd., Gyeonggi-do (KR)

(72) Inventors: Lixiang Xu, Beijing (CN); Wang Hong, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 96 days.

(21) Appl. No.: 14/381,968

(22) PCT Filed: Feb. 27, 2013

(86) PCT No.: PCT/KR2013/001572
§ 371 (c)(1),
(2) Date: Aug. 28, 2014

(87) PCT Pub. No.: WO2013/129832
PCT Pub. Date: Sep. 6, 2013

(65) Prior Publication Data
US 2015/0036512 A1    Feb. 5, 2015

(30) Foreign Application Priority Data

Feb. 28, 2012  (CN) .......................... 2012 1 0048322
May 10, 2012   (CN) .......................... 2012 1 0143932

(51) Int. Cl.
*H04L 12/26* (2006.01)
*H04W 24/10* (2009.01)
(Continued)

(52) U.S. Cl.
CPC .......... *H04W 24/10* (2013.01); *H04L 41/0631* (2013.01); *H04W 24/02* (2013.01); *H04W 36/0055* (2013.01); *H04W 36/14* (2013.01)

(58) Field of Classification Search
CPC ............. H04J 3/14; H04L 43/50; H04L 43/00; H04L 1/00; H04B 10/0771
See application file for complete search history.

(56) References Cited

U.S. PATENT DOCUMENTS

2007/0081487 A1* 4/2007 Akinaga ............... H04W 56/00
                                                              370/328
2010/0173626 A1* 7/2010 Catovic ............... H04W 76/027
                                                              455/423

(Continued)

OTHER PUBLICATIONS

International Search Report dated Jun. 26, 2013 in connection with International Patent Application No. PCT/KR2013/001572, 3 pages.

(Continued)

*Primary Examiner* — Hassan Phillips
*Assistant Examiner* — Siren Wei

(57) ABSTRACT

The present invention discloses a method for reporting RLF information. By sending the RLF report to an access system to which a cell which lead to a problem belongs to, the present invention can avoid unnecessary impact to other RAT to the maximum, guarantees that a problem of a RAT is solved in the RAT, and can detect a reason of radio link failure or handover failure correctly, reduces signaling interaction between different RATs, and simplifies the whole process of self-optimization, enhances performance of mobile communication system.

14 Claims, 9 Drawing Sheets

(51) Int. Cl.
  *H04W 24/02* (2009.01)
  *H04L 12/24* (2006.01)
  *H04W 36/00* (2009.01)
  *H04W 36/14* (2009.01)

(56) References Cited

U.S. PATENT DOCUMENTS

2011/0044285 A1* 2/2011 Jang ............... H04W 36/02
  370/331
2011/0250880 A1  10/2011 Olsson
2013/0242898 A1* 9/2013 Johansson ............. H04W 24/02
  370/329

OTHER PUBLICATIONS

Written Opinion of International Searching Authority dated Jun. 26, 2013 in connection with International Patent Application No. PCT/KR2013/001572, 4 pages.

ETS1 TR 136 902 V9.3.1, "Evolved Universal Terrestrial Radio Access Network (EUTRAN); Self-Configuring and Self-Optimizing Network (SON) Use Cases and Solutions", 3GPP TR 36.902 version 91.3.1 Release 9, May 2011, 23 pages.

Ahmad Awada et al., "Towards Self-Organizing Mobility Robustness Optimization in Inter-RAT Scenario", IEEE Vehicular Technology Conference, Budapest, Hungary, May 2011, 5 pages.

* cited by examiner

METHOD FOR REPORTING RADIO LINK FAILURE INFORMATION

TECHNICAL FIELD

The present invention relates to a field of mobile communication system, and particularly relates to a method for reporting radio link failure (RLF) information.

BACKGROUND ART

With the development of communication technology, mobile communication system develops to a System Architecture Evaluation (SAE) system. FIG. 1 is a schematic diagram illustrating the structure of an existing SAE system. As illustrated in FIG. 1, the system includes an Evolved Universal terrestrial radio access network (E-UTRAN) 101 and a core network at least including a Mobility Management Entity (MME) 105, and a user plane entity (S-GW) 106. The E-UTRAN is used to connect a user equipment (UE) to the core network. The E-UTRAN 101 further includes more than one macro base station (eNB)s 102 and home base stations (HeNB) 103, optionally includes a home base station gateway (HeNB GW) 104. The MME 105 and the S-GW 106 can be integrated in a model to implement, or can be separated to implement independently.

Here, the eNB 102s are connected to each other via X2 interface, and are respectively connected to the MME 105 and the S-GW 106 via S1 interface, or are connected with the optional HeNB GW 104, and then the HeNB GW 104 is respectively connected with the MME 105 and S-GW 106 via S1 interface.

In an initial stage of establishment of the SAE system or in a process of operation of the SAE system, a lot of human and material resource is spent on configuration and optimization of a parameter of the SAE system, particularly on setting of a radio parameter, thus to guarantee good coverage and capacity of the SAE system, mobile robustness, load balancing when the user equipment moves, and access speed of the user equipment etc. At present, a method for self-optimization of the SAE system is provided to save the configuration of the human and the material during the operation of the SAE system. During a process of the self-optimization, the configuration of the eNB and the HeNB is carried out the process of the optimization according to current state of the SAE system. The eNB and the HeNB are generally referred to as "eNB" hereinafter, to instruct the method for the self-optimization of the SAE system.

FIG. 2 is a schematic diagram illustrating the rationale of existing self-optimization for a SAE system, as illustrated in FIG. 2, after the eNB powers up or accesses SAE, eNB can perform the process of self-optimization. The process includes a basic configuration for the eNB, and initialization for the configuration of the radio parameter. Here, the basic configuration for the eNB includes configuration of Internet Protocol (IP) address and detection operation, administration and management (OA&M); authentication between the eNB and the core network; if the eNB acts as a HeNB, the HeNB GW to which the HeNB belongs is further needed to be detected; downloading software and the operation parameter of the eNB and processing self-configuration. The initialization for the configuration of the radio parameter is that eNB needs to initial the configuration of the radio parameter according to environment of region where the eNB locates, since performance of each eNB of the SAE system can be impacted by the environment of the region where the eNB locates.

After the process of the self-configuration is finished, a lot of parameters configured by the eNB are not the optimization, for the better performance of the SAE system, the optimization or adjustment for the eNB configuration is needed, also referred to as self-optimization of mobile communication system. During the process of the optimization or adjustment for the eNB configuration, the eNB controlled by the OA&M in the background can perform the process. there can be a standardized interface between the OA&M and the eNB, the OA&M in the background sends the parameter to be optimized via the interface to the eNB (can be the eNB or HeNB), and then the eNB optimizes the parameter configured on itself, according to the parameter to be optimized. Certainly, the process can also be performed by the eNB itself, i.e. the eNB detects and acquires the performance to be optimized, optimizes and adjusts the corresponding parameter of the eNB itself. The processing of the optimization or adjustment for the eNB configuration includes: self-optimization of a neighbor cell list, self-optimization of coverage and capacity, self-optimization of mobile robustness, self-optimization of load balancing, and self-optimization of a random access channel parameter etc.

At present, the basic principle of self-optimization for mobile robustness in Release 10 is: radio link failure (RLF) or handover failure occurs on the UE, the UE indicates a network that the UE has available RLF report, when the UE is back to a connection mode, the network sends a message to UE to request the report, the RLF report sent by the UE includes the following information: a global cell identity (ECGI) of the cell lastly serving the UE, an ECGI of the cell where the UE attempts to re-establish, the ECGI of the cell where the process of a handover at the last time is triggered, a time interval from the triggering for the handover at the last time to the occurrence of connection failure, a reason of the connection failure, RLF or handover failure, radio measurement. A base station acquiring the RLF report from the UE forwards the acquired RLF report from the UE to the base station lastly serving the UE. The base station lastly serving the UE decides the reason of too early handover, too late handover, handover to an error cell or a coverage hole, if the reason is too early handover or handover to an error cell, the base station sends the information of too early handover or handover to an error cell to the base station where the too early handover is triggered or to the base station of the cell to which UE is handed over.

However, if the existing mechanism is used to detect RLF or handover failure between different RATs (Inter-RAT), efficiency is particular low. Moreover, a problem that the configuration of an RAT is not the optimization, may bring additional processing burden for another RAT. For example, for too late handover from LTE to 3G, if the UE has a re-establishment in 3G at the first time after failure, the UE needs to send the RLF report to the 3G network side, actually the problem is that the handover is not triggered in time in LTE, thus the additional burden is brought to 3G system. If the UE always reports after the UE returns to LTE, there is also a problem. For example for too early handover from 3G to LTE, if the UE always reports after the UE is return to LTE, the unnecessary burden is brought to LTE system, since the unreasonable 3G configuration brings the problem, but the UE needs to report back to LTE. Moreover, after the LTE system receives the RLF report, the LTE system needs to send the RLF report to the cell lastly serving the UE in 3G system, via S1/Iu interface, additional signal interaction is brought.

DISCLOSURE OF INVENTION

Technical Problem

The present invention finds a method to solve the above problem, the UE RLF report is sent in a problem RAT as far as possible, the problem RAT analyses the failure reason, the impact for the other RAT is reduced at the most, reduces the signaling interaction between different RATs.

Solution to Problem

In view of the above, an object of the present invention is to provide a method for reporting RLF information, by sending the RLF report to an access system to which a cell which lead to a problem belongs to, to avoid unnecessary impact to other RAT to the maximum, to guarantee that a problem of a RAT is solved in the RAT, to reduce signaling interaction between different RATs, and to simplify the whole process of self-optimization, to enhance performance of mobile communication system.

To achieve the above object, technical schemes of embodiments of the present invention are performed as follows.

The present invention provides a method for reporting the radio link failure (RLF) information, including:

A failure occurring on a user equipment (UE), wherein the failure includes RLF or handover failure;

sending, by the UE an RLF report to a source access system of previous Inter-RAT handover if the failure occurs within a prescribed period of time after the previous Inter-RAT handover; and sending, by the UE, the RLF report to a target access system of the previous Inter-RAT handover if the failure occurs outside the prescribed period of time after the previous Inter-RAT handover.

Preferably, for the RLF, the previous Inter-RAT handover includes a previous successful Inter-RAT handover, the source access system includes an access system of a source cell for the previous successful Inter-RAT handover, and the target access system includes an access system of a target cell for the previous successful Inter-RAT handover;

for the handover failure, the previous Inter-RAT handover includes a previous successful Inter-RAT handover, the source access system includes an access system of a source cell for the previous successful Inter-RAT handover, and the target access system includes an access system of a target cell for the previous successful Inter-RAT handover; or, the previous Inter-RAT handover includes an Inter-RAT handover at the last time, the source access system includes an access system of a source cell for the Inter-RAT handover at the last time, and the target access system includes an access system of a target cell for the Inter-RAT handover at the last time.

Preferably, the UE calculates a time interval from receiving a handover command message of the previous Inter-RAT handover or sending a handover complete message of the previous Inter-RAT handover, to the occurrence of failure; if the time interval is less than or equal to the prescribed period of time, it is determined that the failure occurs within the prescribed period of time after the previous Inter-RAT handover, and otherwise, it is determined that the failure occurs outside the prescribed period of time after the previous Inter-RAT handover.

Preferably, the UE indicates a network that the UE has RLF report information during a handover process or a process of radio resource control (RRC) connection setup.

Preferably, the RLF report includes a cell identity and/or a RAT type of a cell lastly serving the UE when the RLF occurs, or a cell identity and/or a RAT type of the target cell when the handover failure occurs; and the RLF report further includes: a cell identity and/or a RAT type of a cell where the UE attempts RRC reestablishment or the RRC connection setup at the first time after the failure, and a cell identity and/or a RAT type of a cell where the UE locates before the UE is handed over a failure cell; wherein the cell identity includes: a global cell identity (CGI/ECGI) or a physical cell identity (PCI) and frequency information.

Preferably, the method further includes: determining, by a base station of the access system by which the RLF report is received, a failure reason according to the RLF report;

wherein the failure reason is one of the following reasons: handover to an wrong cell, too early Inter-RAT handover, too late Inter-RAT handover, handover to an wrong RAT or a coverage hole; and the determined failure reason includes:

determining that the failure reason is too early Inter-RAT handover, if the UE recently is handed over between different RATs, and the cell where the UE attempts RRC reestablishment or the RRC connection setup at the first time after the failure belongs to the source RAT;

determining that the failure reason is too late Inter-RAT handover, if the UE is not recently handed over, the cell lastly serving the UE does not belong to the access system of the cell where the UE attempts RRC reestablishment or the RRC connection setup at the first time after the failure;

determining that the failure reason is handover to an error RAT, if the UE is recently handed over between different RATs, and the cell where the UE attempts RRC reestablishment or the RRC connection setup at the first time after the failure does to belong to the RAT to which the cell lastly serving the UE belongs or to which the target cell when the handover fails belongs, and does not belong to the RAT to which the cell where the UE locates before the UE is handed over to the failure cell belongs;

determining that failure reason is handover to an wrong cell, if the UE is recently handed over between different RATs, and the cell where the UE attempts RRC reestablishment or the RRC connection setup at the first time after the failure belongs to the RAT to which the target cell for the handover at the last time before the failure belongs, but does not belongs to the RAT to which the target cell for the handover at the last time belongs.

Preferably, the base station sends a handover report to the base station of the cell where the handover is triggered at the last time, if the failure reason is handover to an wrong cell, too early Inter-RAT handover, handover to an wrong RAT and the base station is not the base station of the cell where the handover is triggered at the last time; the base station sends the handover report to the base station of the cell lastly serving the UE before the failure, if the failure reason is too late Inter-RAT handover, and the base station is not the base station lastly serving the UE before the failure; and the handover report includes: the cell identity and/or the RAT type of the target cell for the handover at the last time, the cell identity and/or the RAT type of the source cell for the handover at the last time, and/or the cell identity and/or RAT type of the cell where the UE attempts RRC reestablishment or the RRC connection setup at the first time after the failure; the handover report further includes: a problem indication of too early Inter-RAT handover, too late Inter-RAT handover, handover to an wrong RAT or handover to the wrong cell;

the base station sends a coverage problem report to the base station of the cell lastly serving the UE before a connection fails; the coverage problem report includes the global cell identity of the cell lastly serving the UE.

Preferably, the UE stores a part or all of the following information, after the failure occurs on the UE, wherein the information includes:

the cell identity of the failure cell; for the handover failure, the cell identity of the failure cell is the global cell identity or the physical cell identity and the frequency of the target cell for the handover, for the RLF, the cell identity of the failure cell is the global cell identity or the physical cell identity and the frequency of the cell where the RLF occurs;

a previous cell identity is the global cell identity or the physical cell identity and the frequency of the cell from which the UE receives a handover command message at the last time before the failure; if the cell from which the UE receives the handover command message at the last time before the failure is a UMTS cell, optionally a Location Area Identity (LAI) of a Location Area to which the cell belongs, a Router Area Code (RAC) of a Router Area to which the cell belongs is stored, if the cell from which the UE receives the handover command message at the last time before the failure is an LTE cell, optionally a Tracking Area Identity (TAI) of a Tracking Area to which the cell belongs is stored;

the cell identity and/or the RAT type of the cell where the UE attempts RRC reestablishment or the RRC connection setup at the first time after the failure;

the time interval from the receipt of the handover command message at the last time to the occurrence of the RLF or the handover failure.

The present invention provides another method for reporting radio link failure (RLF) information, including:

a failure occurring on a user equipment (UE), wherein the failure includes RLF or handover failure;

sending, by the UE, a RLF report to a source access system from which a handover command is sent, if the failure is the handover failure; sending, by the UE, the RLF report to an access system to which a cell where the RLF occurs belongs.

Preferably, the UE sends the RLF report to a base station belong to the source access system, when the UE re-accesses a cell of the source access system from which a handover command is sent, if the failure is the handover failure; and the UE sends the RLF report to a base station which belongs to an access system of a cell where the RLF occurs, when the UE re-accesses a cell which belongs to an access system of the cell where the RLF occurs, if the failure is RLF.

Preferably, the UE indicates that the UE has RLF report information to the base station during a process of the handover or radio resource control (RRC) connection setup.

Preferably, the RLF report includes: a cell identity and/or a RAT type of the cell lastly serving the UE when the RLF occurs, or, a cell identity and/or a RAT type of the target cell when the handover failure occurs; and the RLF report further includes: a cell identity and/or a RAT type of the cell where the UE attempts RRC connection reestablishment or RRC connection setup at the first time after the failure occurs, and a cell identity and/or a RAT type of the cell where the UE locates before the UE is handed over to a failure cell; wherein the cell identity is: a global cell identity (CGI/ECGI) or a physical cell identity (PCI) and frequency information.

Preferably, the method further includes: the base station receiving the RLF report from the UE determines a failure reason according to the RLF report; or the base station receiving the RLF report from the UE sends the RLF report to a source base station sending a handover command for the handover failure, the source base station determines the failure reason, the base station receiving the RLF report from the UE sends the RLF report to the base station where the UE locates when the RLF occurs, the base station determines the failure reason;

the failure reason is one of the following reasons: handover to an wrong cell, too early Inter-RAT handover, too late Inter-RAT handover, handover to an wrong RAT or a coverage hole; and determining the reason of the failure includes:

determining that the failure reason is the too early Inter-RAT handover, if the UE is recently handed over between different RATs, and the cell where the UE attempts RRC reestablishment or the RRC connection setup at the first time after the failure belongs to the source RAT;

determining that the failure reason is too late Inter-RAT handover, if the UE is not recently handed over, the cell lastly serving the UE does not belong to the access system of the cell where the UE attempts RRC reestablishment or the RRC connection setup at the first time after the failure;

determining that the failure reason is handover to an wrong RAT, if the UE is recently handed over between different RATs, and the cell where the UE attempts RRC reestablishment or the RRC connection setup at the first time after the failure does to belong to the RAT to which the cell lastly serving the UE belongs or to which the target cell when the handover failure belongs, and does not belong to the RAT to which the cell where the UE locates before the UE is handed over to the failure cell belongs;

determining that the failure reason is handover to an wrong, if the UE is recently handed over between different RATs, and the cell where the UE attempts RRC reestablishment or the RRC connection setup at the first time after the failure belongs to the RAT to which the target cell for the handover at the last time before the failure belongs, but does not the target cell for handover at the last time.

Preferably, the base station determining the failure reason sends a handover report to the base station of the cell where the handover is triggered at the last time, if the failure reason is handover to an wrongcell, too early Inter-RAT handover, handover to an wrongRAT, and the base station which determines the failure reason is not the base station of the cell where the handover is triggered at the last time; the base station determining the failure reason sends the handover report to the base station of the cell lastly serving the UE before the failure, if the failure reason is too late Inter-RAT handover, and the base station determining the failure reason is not the base station of the cell lastly serving the UE; and the handover report includes: the cell identity and/or the RAT type of the target cell for the handover at the last time, the cell identity and/or the RAT type of the source cell for the handover at the last time, and/or the cell identity and/or the RAT type of the cell where the UE attempts RRC reestablishment or the RRC connection setup at the first time after the failure; the handover report further includes: a problem indication of too early Inter-RAT handover, too late Inter-RAT handover, handover to an wrong RAT or handover to an wrong cell;

the base station determining the failure reason sends a coverage problem report to the base station of the cell lastly serving the UE before a connection fails; the coverage problem report includes the global cell identity of the cell lastly serving the UE.

The handover report is forwarded via a core network to the base station needing to receive the handover report, if the base station receiving the RLF report from the UE and the base station needing to receive the handover report belong to different RATs, for an Universal Mobile Telecommunications System (UMTS) cell, the handover report further includes the cell identity of the cell where the handover is triggered at the last time, and/or a Location Area Identity (LAI) of a Location Area to which the cell belongs, a Router Area Code (RAC) of a Router Area to which the cell belongs, optionally further includes an identity of a radio network controller (RNC) to which the cell belongs; for an Long Term Evaluation (LTE) cell, the handover report further includes the cell identity of the cell where the handover is triggered at the last time and/or a Tracking Area Identity (TAI) of a Track Area to which the cell belongs.

The UE stores a part or all of the following information, after the failure occurs on the UE, wherein the information includes:

the cell identity of the failure cell; for the handover failure, the cell identity of the failure cell is the global cell identity or the physical cell identity and the frequency of the handover target cell, for the RLF, the cell identity of the failure cell is the global cell identity or the physical cell identity and the frequency of the cell where the RLF occurs;

The previous cell identity is the global cell identity or the physical cell identity and the frequency of the cell from which the UE receives the handover command message at the last time before the failure occurs on the UE; optionally the LAI of the Location Area to which the cell from which the UE receives the handover command message at the last time before the failure occurs on the UE belongs, the RAC of the Router Area to which the cell belongs, the identity of the radio network controller (RNC) to which the cell belongs is stored, if the cell is the UMTS cell; optionally the TAI of the Tracking Area to which the cell from which the UE receives the handover command message at the last time before the failure occurs on the UE belongs is stored, if the cell is the LTE cell;

a time interval from the receipt of the handover command message at the last time to the occurrence of RLF or the handover failure.

Advantageous Effects of Invention

It can be seen from the above technical scheme that the method for reporting RLF information provided by the present invention by sending RLF report including RLF information or handover failure information by the UE according to actual condition, the RLF report including the RLF information or the handover failure information is sent to an access system of the cell leading to the problem. The access system receiving the RLF report can determine a reason leading to the occurrence of the RLF or handover failure according to the RLF report. Thus, adverse effect for the other RAT is avoided. It is guaranteed that the problem of a RAT is solved in the RAT. Performance of the mobile communication system is improved.

MODE FOR THE INVENTION

In order to make the purpose, technical schemes and advantages of the present invention more clear, the present invention is further described in detail hereinafter with reference to drawings and embodiments.

The main idea of the present invention is: by optimally sending an RLF report to an access system of a cell that leads to a problem, unnecessary impact to other RATs can be avoided to the maximum, and it is guaranteed that a problem of a RAT is solved in the RAT, a reason of radio link failure or handover failure can be detected correctly, and signallings among different RATs are reduced, the whole self optimization process is simplified, performance of the mobile communication system is enhanced.

In order to make the purpose, technical schemes and advantages of the present invention more clear, the present invention is further described in detail hereinafter with reference to drawings and embodiments.

If there is no special instruction, "RLF, handover failure and other failure" is generally referred to as "failure" hereinafter to simplify description. The present invention relates to a method to report RLF information on UE side and a method to detect failure reason on base station side. These two aspects would both be involved in the following description.

Figure 1:
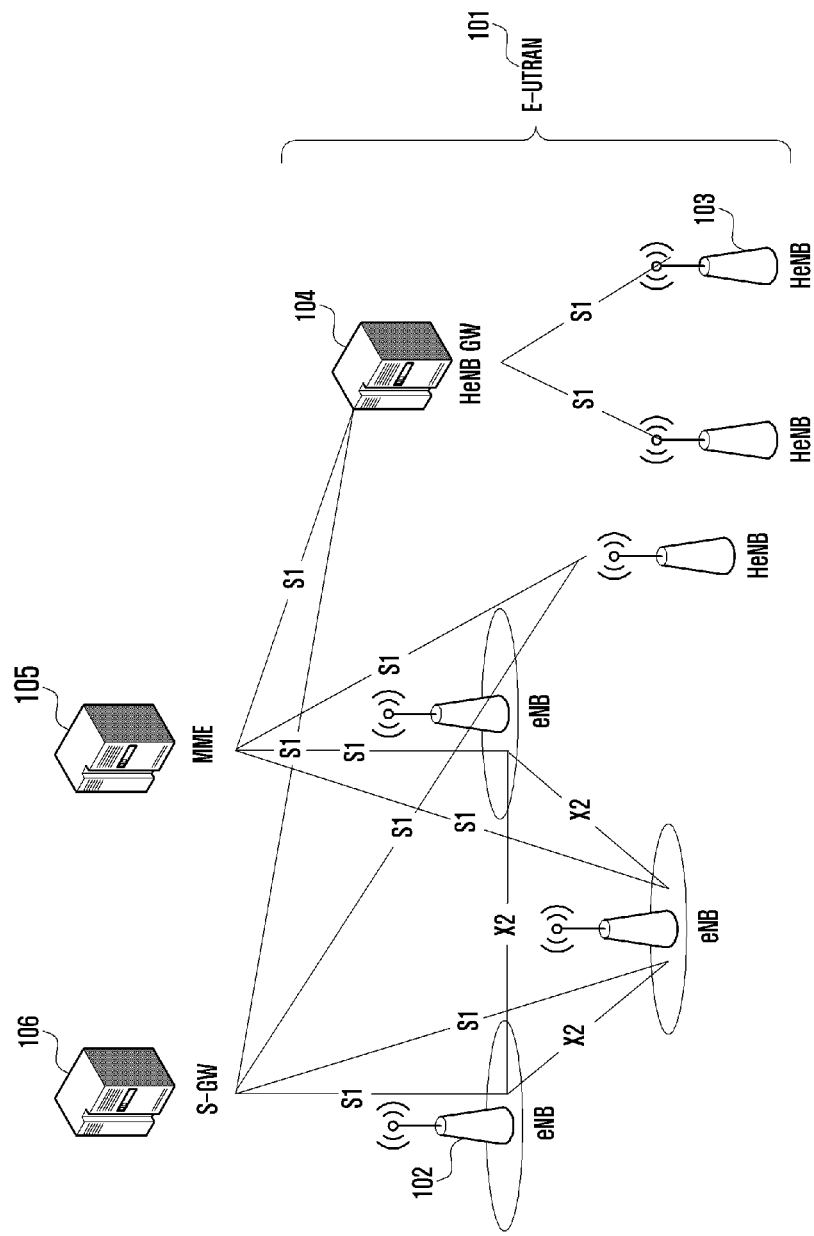
FIG. 1 is a schematic diagram illustrating the structure of an existing SAE system.
Figure 2:
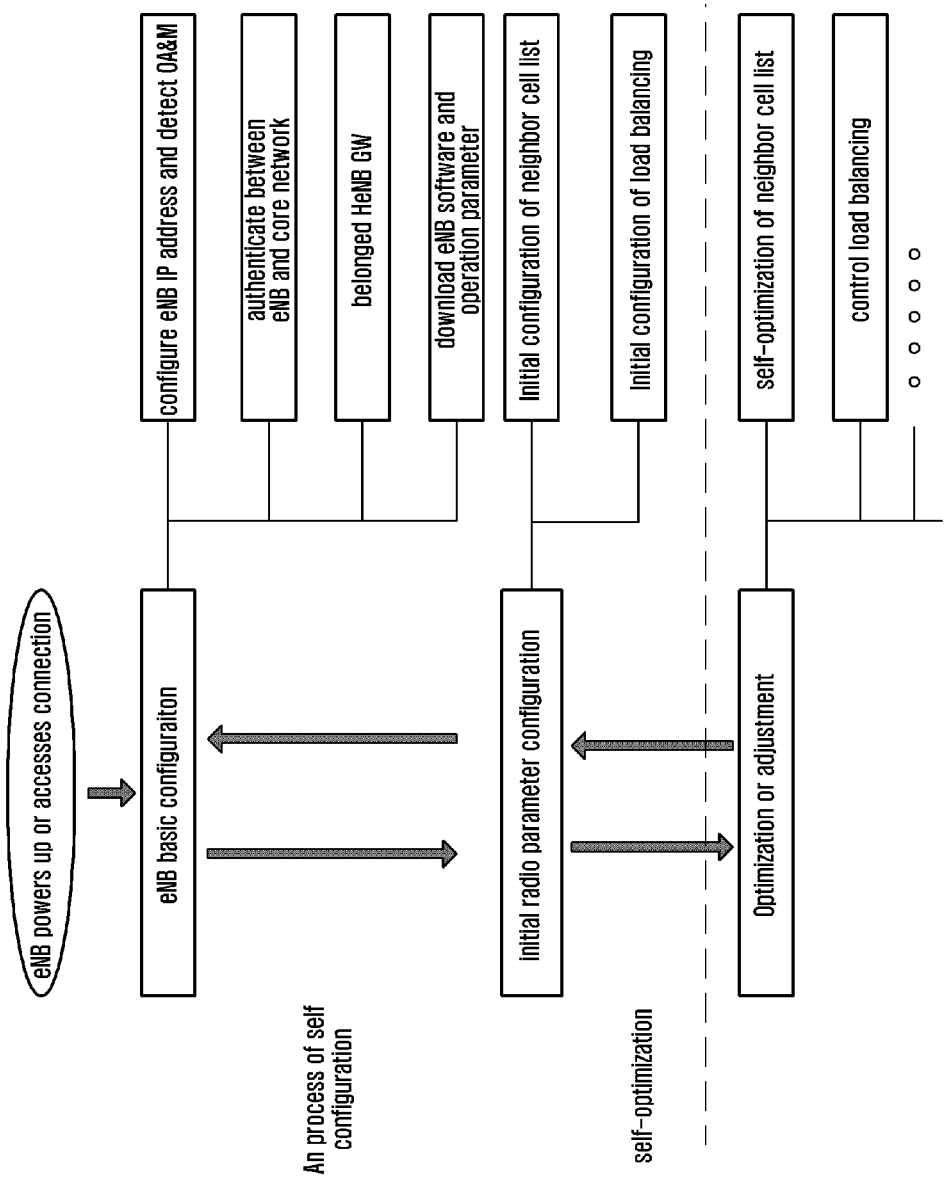
FIG. 2 is a schematic diagram illustrating the rationale of existing self-optimization for a SAE system.
Figure 3:
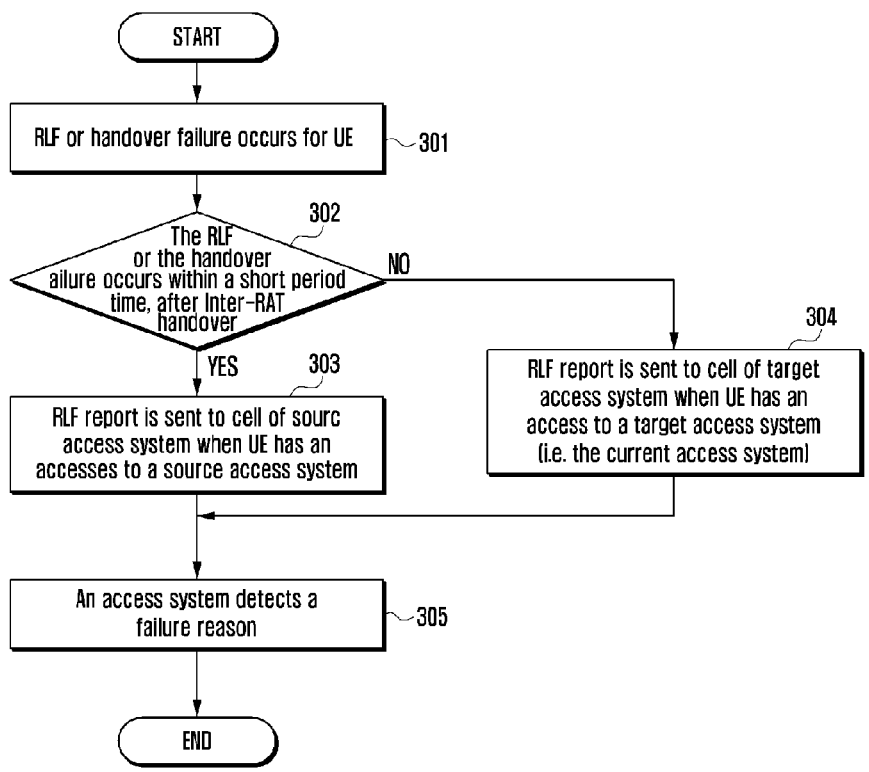
FIG. 3 is a flow chart illustrating a process of a UE reporting RLF information and a base station detecting failure reason according to method 1 of the present invention.

FIG. 3 is a flow chart illustrating a process of a UE reporting RLF information and a base station detecting failure reason according to method 1 of the present invention. As illustrated in FIG. 2, the process includes:

Step 301: RLF or handover failure occurs on the UE.

In the step, the UE can store a part or all of the following information:

1) a cell identity of a failure cell. For the handover failure, a global cell identity or a physical cell identity and frequency of a handover target cell is set as the cell identity of the failure cell. For RLF, the global cell identity or the physical cell identity and frequency of the cell in which the RLF occurs is set as the cell identity of the failure cell.

2) a previous cell identity is the global cell identity or the physical cell identity of the cell in which the UE receives a handover request at the last time. If the cell in which the UE receives the handover request at the last time is a UMTS cell, a Location Area Identity (LAI) of a Location Area to which the cell belongs, a Router Area Code (RAC) of a Router Area to which the cell belongs, an identity of an RNC to which the cell belongs can be stored. If the cell in which the UE receives the handover request at the last time is an LTE cell, a TAI (Tracking Area Identity) of a Tracking Area to which the cell belongs can be stored.

3) a cell identity and/or a RAT type of a cell where the UE attempts RRC reestablishment or the RRC connection setup at the first time after the failure.

4) a time interval from the receipt of the handover command message at the last time to the occurrence of the RLF or handover failure.

Step 302: it is decided whether the above mentioned failure occurs within a short period of time after the previous Inter-RAT handover. If yes, perform step 303; otherwise, perform step 304.

In the step, the UE can acquire whether the failure occurs within a short period of time after the previous Inter-RAT handover according to the time interval from the sending of the handover command message of the previous Inter-RAT handover or the sending of the handover complete message by the UE during the previous Inter-RAT handover, to the failure occurrence. The time interval can be compared with a clock value to decide whether the time interval is short or long. Here, the clock value can be a prescribed typical time value, or decided by UE implementation, i.e. the time value is prescribed in the implementation; or, the clock value can be a time value configured for the UE by a network. The clock value can be the same in all RATs, or be related with specific RATs, i.e., the clock value can be different in different RATs. The network can configure the clock value for the UE when the network configures Inter-RAT handover parameters, or the network can make use of a base station to configure the clock value for the UE via other RRC messages.

Actually, this step is to decide whether the failure occurs within or out of the preconfigured period of time after the previous Inter-RAT handover.

The handover command message of the previous Inter-RAT handover and the handover complete message sent by the UE in the previous Inter-RAT handover are generally referred to as "a handover command" hereinafter.

Specifically, for a definition of "the previous Inter-RAT handover", no matter for RLF or handover failure, the previous successful Inter-RAT handover ("a previous successful handover" in abbreviation hereinafter) can be generally referred to as "a previous Inter-RAT handover" by the UE. In this case, the UE decides a RAT to which a cell that an RLF report is to be sent to belongs by determining the length of time interval from the previous successful handover to the occurrence of failure. Moreover, in this case, a source access system is an access system to which the source cell of the previous successful handover belongs. The target access system is an access system to which the target cell of the previous successful handover belongs, i.e., the access system where failure occurs on the UE.

For handover failure (including: Intra-RAT and Inter-RAT), there are two ways to define "a previous Inter-RAT handover".

The first way is the same as defined above, that is, the previous successful handover is referred to as "a previous inter-RAT handover". In this way, the source access source is an access system to which the source cell of the previous successful handover belongs. The target access source is an access system to which the target cell of the previous successful handover belongs, i.e., the access system where the UE occurs failure.

The second way is to take the Inter-RAT handover at the last time (i.e., failure Inter-RAT handover for this time) as "a previous Inter-RAT handover". In this way, the UE decides a RAT to which a cell that an RLF report is to be sent to belongs by determining the length of time interval from the handover command of Inter-RAT handover at the last time to the occurrence of handover failure. Thus, the source access system is the access system to which the source cell of handover for this time belongs, i.e. the access system where the failure occurs on the UE The target access system is the access system to which the target cell of the handover for this time belongs, i.e., the access system of the target cell which the UE can not successfully access.

Step 303: if handover failure or RLF occurs on the UE in a short time after the previous Inter-RAT handover, the UE sends the RLF report to the cell which belongs to the source access system of the previous Inter-RAT handover. When the UE enters a connection mode in the cell of the source access system (via RRC connection setup or handover), the UE sends the RLF report to the cell of the source access system, and then step 305 is performed.

In this step, the definition of "a previous Inter-RAT handover" is the same as that of step 302, which is not described repeatedly here.

The RLF report includes: the cell identity and/or the RAT type of the cell lastly serving the UE, or the cell identity and/or the RAT type of the target cell when the handover fails. The RLF report also includes: the cell identity and/or the RAT type of the cell where the UE attempts RRC reestablishment or the RRC connection setup at the first time after the failure. Here, the cell identity can be the global cell identity (CGI/ECGI) or the physical cell identity (PCI) and the frequency information.

Step 304: if the RLF or the handover failure occurs on the UE within a long period of time after the previous Inter-RAT handover, the UE sends the RLF report to the cell which belongs to the target access system of the previous Inter-RAT handover. When the UE has an access to the cell of the target access system (via RRC connection setup or handover), the RLF report is sent to the cell of the target access system, and then step 305 is performed.

In this step, the definition of "a previous Inter-RAT handover" is the same as that of step 302. For the handover failure, if the previous Inter-RAT handover is defined according to the second way in step 302, step 303 is performed since the time interval is always short. The content contained in the RLF report is the same as that of step 303, which is not described repeatedly here.

Step 305: the access system receiving the RLF report from the UE decides the reason of the RLF or the handover failure.

If the source access system receives the RLF report from the UE, the source access system decides the reason of the RLF or the handover failure. If the target access system receives the RLF report from the UE, the target access system decides the reason of the RLF or the handover failure.

In this step, the reason which leads the RLF or the handover failure occurs on the UE is one of the following reasons: handover to an error cell, too early Inter-RAT handover, too late Inter-RAT handover, handover to an error RAT, or a coverage hole.

In the access system, an operation to decide the failure reason is performed by the base station. The base station decides a problem of Mobility Robustness Optimization (MRO) according to the following method:

If no handover happens recently, and the cell lastly serving the UE and the cell where the UE attempts RRC reestablishment or the RRC connection setup at the first time after the failure belong to different access systems, the problem is too late Inter-RAT handover. For example, the cell lastly serving the UE is the LTE cell, the RRC establishment attempt cell is the UMTS cell, and the problem is too late Inter-RAT handover from LTE to UMTS.

If the handover between different RATs recently happens on the UE, and the cell where the UE attempts RRC reestablishment or the RRC connection setup at the first time after the failure does not belong to the RAT to which the cell lastly serving the UE belongs or the RAT to which the cell where the UE locates before the UE is handed over to the failure cell belongs, the problem is handover to an wrong RAT.

If the handover between different RATs recently occurs on the UE, and the cell where the UE attempts RRC reestablishment or the RRC connection setup at the first time after the failure belongs to the RAT to which the target cell for the handover at the last time before the failure belongs, but does not the target cell for the handover at the last time, the problem is handover to the wrong cell.

Here, the way to decide whether the handover happens recently between different RATs on the UE is: it is decided that whether the time interval from the previous handover between different RATs to the occurrence of the failure is less than the preconfigured time reference value, if less, it is decided that the handover happens recently between different RATs on the UE.

If handover to the error cell, too early Inter-RAT handover, or handover to the error RAT is decided as the reason of the RLF or the handover failure is, the base station sends a handover report to the base station of the cell where the handover at the last time is triggered. If the current base station is the base station of the cell where the handover is triggered at the last time, the message does not need to be sent. If too late Inter-RAT handover is decided as the reason of the RLF or the handover failure, the base station sends the handover report to the base station of the cell lastly serving the UE before the failure. If the current base station is the base station of the cell lastly serving the UE before the failure, the message does not need to be sent. If coverage hole is decided as the reason of the RLF or the handover failure, the base station sends a coverage problem report to the base station of the cell lastly serving the UE before a connection fails. The coverage problem report includes the global cell identity of the cell lastly serving the UE.

The handover report includes: the cell identity and/or the RAT type of the target cell for the handover at the last time, and/or the cell identity and/or the RAT type of the source cell for the handover at the last time, and/or the cell identity and/or the RAT type of the cell where the UE attempts RRC reestablishment or the RRC connection setup at the first time after the failure. The handover report further includes: the problem indication of too early handover, too late Inter-RAT handover, handover to the error RAT or handover to the error cell.

So far, the work flow of the UE reporting RLF information and the base station detecting failure reason provided in method 1 of the present invention is finished.

Figure 4:
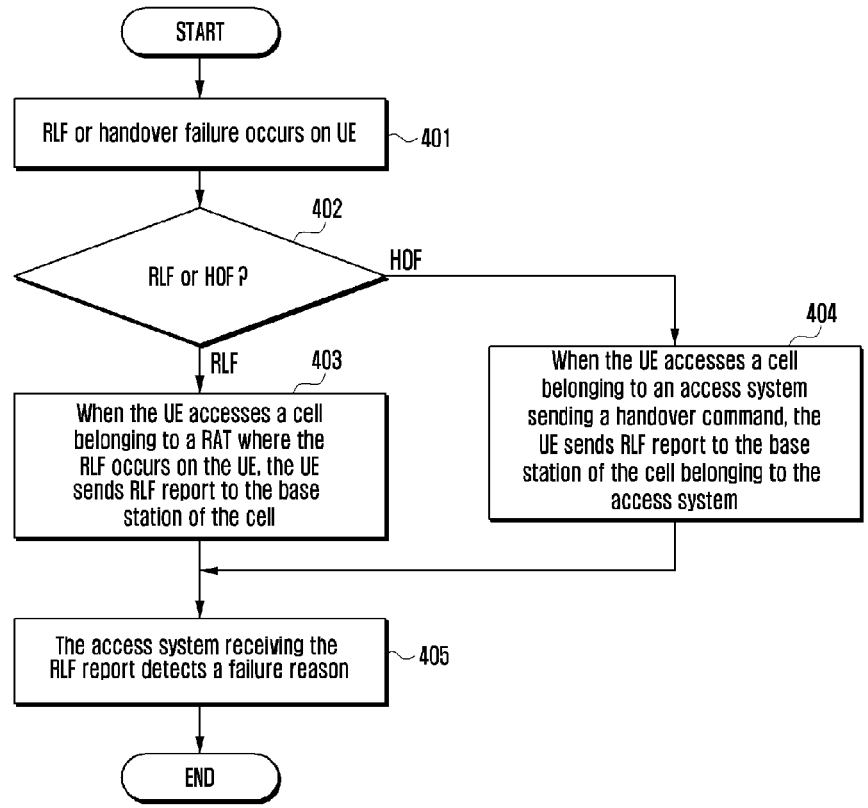
FIG. 4 is a flow chart illustrating a process of a UE reporting RLF information and a base station detecting failure reason according to method 2 of the present invention.

FIG. 4 is a flow chart illustrating a process of a UE reporting RLF information and a base station detecting failure reason according to method 2 of the present invention.

Step 401: RLF or handover failure occurs on the UE.

In the step, the UE needs to store a part or all of the following information:

1) cell identity of failure cell. For the handover failure, a global cell identity or a physical cell identity and frequency of a handover target cell is set as the cell identity of the failure cell. For the RLF, the global cell identity or the physical cell identity and the frequency of the cell where the RLF occurs is set as the cell identity of the failure cell.

2) the previous cell identity is the global cell identity or the physical cell identity and the frequency of the cell from which the UE receives a handover command at the last time before the failure occurs on the UE. If the cell from which the UE receives the handover command at the last time is an UMTS cell, a Location Area Identity (LAI) of a Location Area to which the cell belongs, a Router Area Code (RAC) of a Router Area to which the cell belongs, an identity of an RNC to which the cell belongs can be stored. If the cell from which the UE receives the handover command at the last time is an LTE cell, a Tracking Area Identity (TAI) of a Tracking Area to which the cell belongs can be stored.

3) the cell identity and/or the RAT type of the cell where the UE attempts RRC reestablishment or the RRC connection setup at the first time after the failure.

4) a time interval from the receipt of the handover command at the last time to the occurrence of the RLF or the handover failure.

Step 402: if the RLF occurs on the UE, step 403 is performed, if the handover failure (HOF) occurs on the UE, step 404 is performed.

Step 403: When the UE re-accesses a cell which belongs to a RAT where the UE locates when the RLF occurs, the UE sends the RLF report to a base station of the cell.

In the step, the UE can indicate the base station that the UE has RLF report information in a RRC connection setup request, a RRC connection setup complete, a RRC connection re-establishment request, a RRC connection re-establishment complete, a handover complete, a RRC connection reconfiguration complete or other RRC message. After a indication is received, the base station can request the UE to report the RLF report information. The UE sends the stored the RLF report to the base station.

In the step, a content of the RLF report is the same as that of step 303, which is not described repeatedly here.

Step 404: when the UE re-accesses a cell which belongs to an access system from which the handover command is sent at the last time before failure, the UE sends the RLF report to the base station of the cell.

In the step, the UE can indicate the base station that the UE has the RLF report information in the RRC connection setup request, the RRC connection setup complete, the RRC connection re-establishment request, the RRC connection re-establishment complete, the handover complete, the RRC connection reconfiguration complete or other RRC message.

After the indication is received, the base station can request the UE to report the RLF report information. The UE sends the stored RLF report to the base station.

In the step, the content of the RLF report is the same as that of step 303, where is not described repeatedly here.

Step 405: the reason of the RLF or the handover failure is decided by the access system which receives the RLF report from the UE. The failure reason can be decided by the base station which receives the UE RLF report or the base station lastly serving the UE lastly when the failure occurs.

It is noted that, in the step, the reason that leads the RLF or the handover failure occurs on the UE includes handover to an wrong cell, too early Inter-RAT handover, the too late Inter-RAT handover, handover to an wrong RAT, or a coverage hole.

In the step, a method to determine the failure reason is the same as that of step 305, which is not described repeatedly here.

If the problem of too early Inter-RAT handover for mobility robustness optimisation, handover to the wrong RAT, the handover to the wrong cell is determined as the reason of the RLF or the handover failure, the base station sends the handover report to the base station of the cell where the handover is triggered at the last time. If the current base station is the base station of the cell where the handover is triggered at the last time, the message does not need to be sent. If too late Inter-RAT handover is determined as the reason of the RLF or the handover failure, the base station sends the handover report to the base station of the cell lastly serving the UE before the failure. If the current base station is the base station of the cell lastly serving the UE before the failure, the message does not need to be sent. If coverage hole is determined as the reason of the RLF or the handover failure, the base station sends a coverage problem report to the base station of the cell lastly serving the UE before a connection fails. The message of the coverage problem report includes the global cell identity of the cell lastly serving the UE.

The handover report includes the cell identity and/or the RAT identity of the target cell for the handover at the last time and/or the cell identity and/or the RAT identity of the source cell for the handover at the last time, and/or the cell identity and/or the RAT type of the cell where the UE attempts RRC reestablishment or the RRC connection setup at the first time after the failure. The handover report also includes: the problem indication of too early Inter-RAT handover, too late Inter-RAT handover, handover to the wrong RAT, or handover to the wrong cell.

So far, the work flow of the UE reporting RLF information and the base station detecting failure reason provided in method 2 of the present invention is finished.

Two methods of the present invention are instructed above in detail. Embodiments are illustrated in the following description in detail respectively, according to the above mentioned methods.

Figure 5:
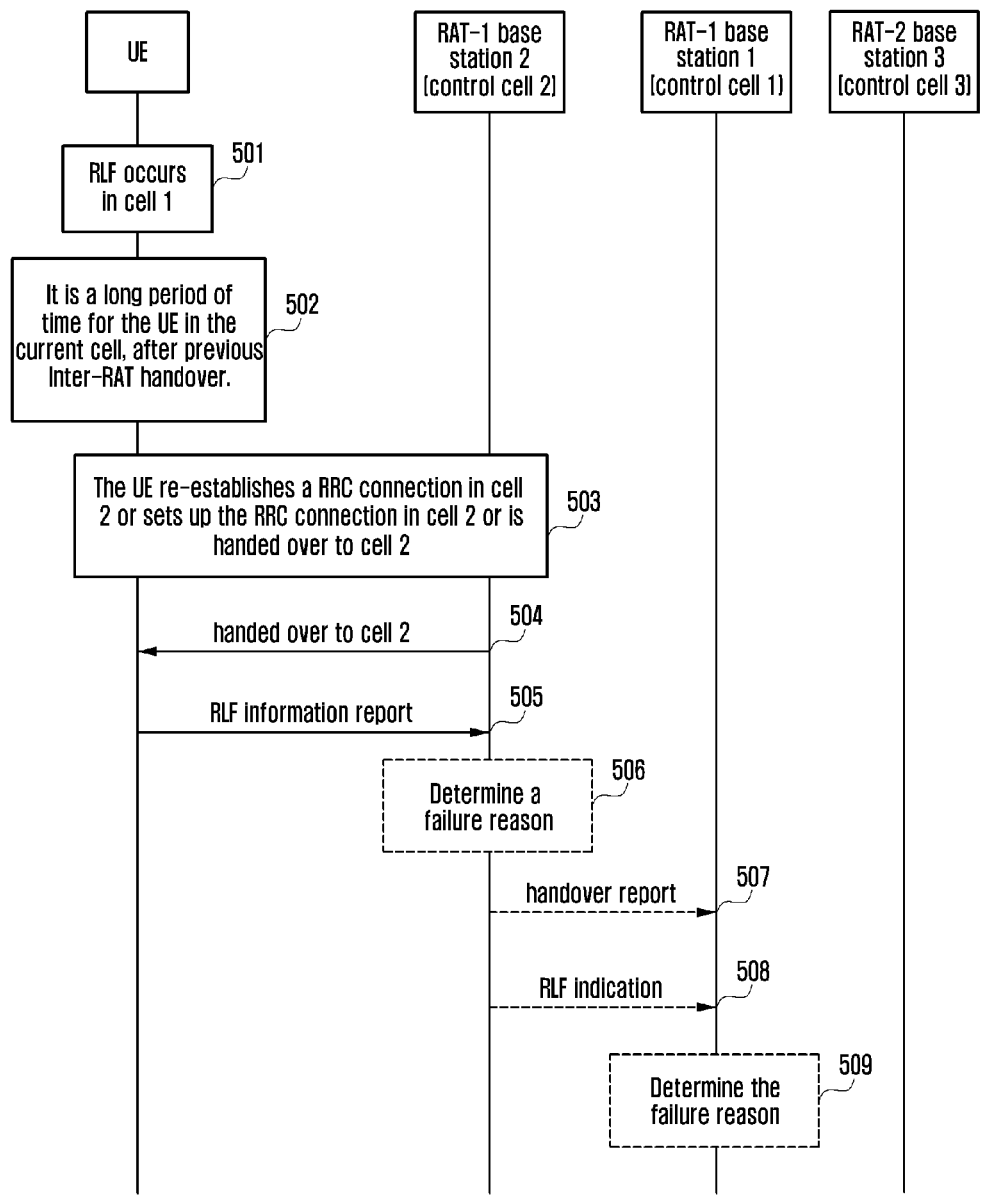
FIG. 5 is a flow chart illustrating a process of a UE reporting RLF information and a base station detecting failure reason according to embodiment 1 of method 1 of the present invention.

FIG. 5 is a flow chart illustrating a process of a UE reporting RLF information and a base station detecting failure reason according to embodiment 1 of method 1 of the present invention. For example, the embodiment can be used in the following scenario: a handover from LTE to 3G is too late, the RLF occurs on the UE in LTE cell 1. When the UE re-accesses an LTE cell (for example, the UE accesses cell 2 or hands over to cell 2), the UE sends stored RLF report information to a base station of cell 2. Here, after the UE access cell 1, RLF occurs on the UE, the UE can firstly accesses a 3G cell, for example cell 3, and then has an access back to LTE cell 2, or hands over to cell 2. As illustrated in FIG. 5, a process includes:

Step 501: the RLF occurs on the UE in cell 1, cell 1 is controlled by RAT-1 base station 1.

Step 502: it is a long period of time for the UE in the current cell, after previous Inter-RAT handover.

In the step, a time length can be determined according to the comparison between a time interval from the receipt of a handover command of the Inter-RAT handover or the sending of a handover complete message of the Inter-RAT handover to the occurrence of failure and a clock value. Please refer to that of step 302 for set of the clock value, which is not described repeatedly here.

Step 503: after the UE has an access back to a RAT-1 cell, for example the UE sets up a RRC connection with RAT-1 cell 2 or performs a RRC connection reestablishment or hands over to RAT-1 cell 2, the UE indicates the base station that the UE has the RLF report information in a RRC connection setup request, a RRC connection setup complete, a RRC connection re-establishment request, a RRC connection re-establishment complete, a handover complete, a RRC connection reconfiguration complete or other RRC message.

Step 504: base station 2 requests the UE to report the RLF information.

Step 505: the UE sends the stored RLF report to base station 2. Content of the UE RLF report is the same as that of step 303, which is not described repeatedly here.

Here, there are two methods for RAT-1 to detect the reason of RLF or handover failure. Method 1 is that the base station of the cell which receives the RLF report determines the reason which leads the failure occurs on the UE, as that of step 506 and step 507. Method 2 is that the base station of the cell which receives the RLF report sends the RLF report to the base station of the cell where the RLF occurs or the base station of the cell where the handover is triggered when the handover fails, the base station of the cell where the RLF occurs or where the handover is triggered when the handover fails determines the failure reason, as that of step 508 and step 509.

Step 506: base station 2 of RAT-1 decides the failure reason.

Same as that of step 305, the reason which leads the RLF or the handover failure occurs on the UE is one of the following reasons: handover to an wrong cell, too early Inter-RAT handover, too late Inter-RAT handover, handover to an wrong RAT, or a coverage hole. In the step, the method to determine the failure reason is also the same as that of step 305, which is not described repeatedly here.

Step 507: if the reason is too late Inter-RAT handover, RAT-1 base station 2 sends a handover report to the base station of the cell where the RLF occurs. If the reason is too early Inter-RAT handover, handover to the wrong RAT or handover to the wrong cell, RAT-1 base station 2 sends the handover report to the base station of the cell where the handover is triggered at the last time. The handover report includes the cell identity of the cell where the RLF occurs and the failure reason, for example too early Inter-RAT handover, too late Inter-RAT handover, handover to the wrong RAT or handover to the wrong cell. The handover report includes the cell identity and/or the RAT type of the target cell for the handover at the last time, the cell identity and/or the RAT type of the source cell for the handover at the last time, and/or the cell identity and/or the RAT type of the cell where the UE attempts RRC reestablishment or the RRC connection setup at the first time after the failure.

If the coverage hole is decided as the reason of the RLF or the handover failure, the base station sends a coverage problem report to the base station of the cell lastly serving the UE before a connection fails. The coverage problem report includes the global cell identity of the cell lastly serving the UE.

Step 508: RAT-1 base station 2 sends the RLF report received from the UE via a RLF indication message to the base station of the cell where the RLF occurs.

Step 509: RAT-1 base station 1 determines the failure reason. Detailed methods to determine the failure reason is the same as that of step 506, which is not described repeated here. If the problem of too early Inter-RAT handover for mobility robustness optimisation, handover to the wrong RAT or handover to the wrong cell is decided as the reason of the RLF or the handover failure, base station 1 sends the handover report to the base station of the cell where the handover is triggered at the last time. If the coverage hole is decided as the reason of the RLF or the handover failure, base station 1 sends the coverage problem report to the base station of the cell lastly serving the UE before the failure, the coverage problem report includes the global cell identity of the cell lastly serving the UE.

The handover report includes the cell identity and/or the RAT type of the target cell for the handover at the last time, and/or the cell identity and/or the RAT type of the source cell for handover at the last time, and/or the cell identity and/or the RAT type of the cell where the UE attempts RRC reestablishment or the RRC connection setup at the first time after the failure. The handover report includes a problem indication of too early Inter-RAT handover, handover to the wrong RAT or handover to the wrong cell.

So far, the whole work flow of the UE reporting RLF information and the base station detecting the failure reason provided in embodiment 1 of method 1 of the present invention is finished.

Figure 6:
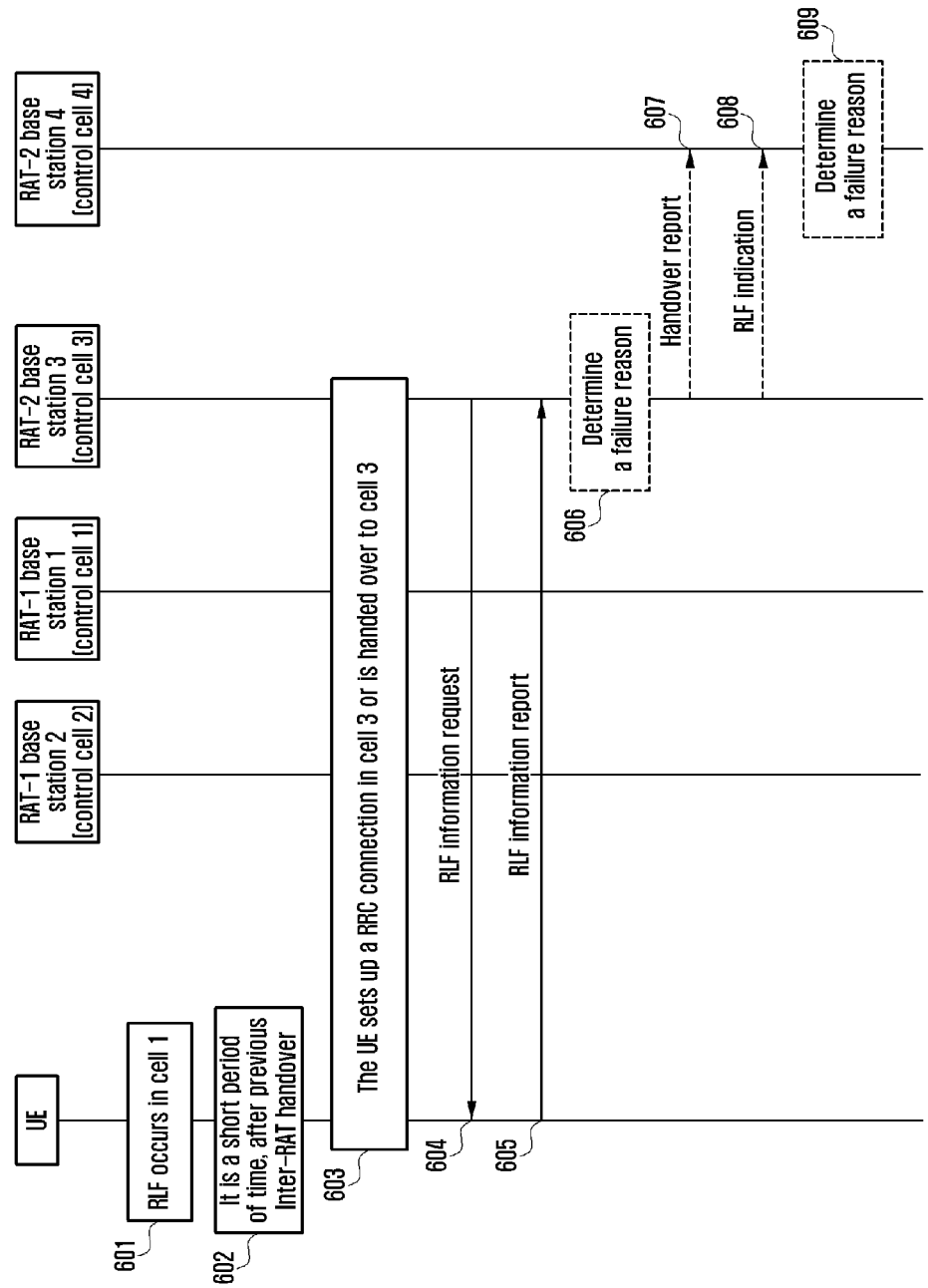
FIG. 6 is a flow chart illustrating a process of a UE reporting RLF information and a base station detecting failure reason according to embodiment 2 of method 1 of the present invention.

FIG. 6 is a flow chart illustrating a process of a UE reporting RLF information and a base station detecting failure reason according to embodiment 2 of method 1 of the present invention. For example, the embodiment can be used in the following scenario: 3G RNC4 hands over the UE from cell 4 to cell 1 of LTE base station 1, the UE has an access back to 3G cell 3 after the handover is completed immediately. As illustrated in FIG. 6, the process includes:

Step 601: RLF occurs on the UE in cell 1, cell 1 is controlled by RAT-1 base station 1.

Step 602: the UE stays in the current cell for a short period of time, after previous Inter-RAT handover.

In the step, the UE can determine a time length according to the comparison between a time interval from the receipt of a handover command of the previous Inter-RAT handover or the sending of a handover complete message of the previous Inter-RAT handover to the occurrence of failure, with a fixed clock value. Detail is the same as that of step 302, which is not described repeatedly here. Moreover, the UE records a source access system type of the previous Inter-RAT handover and/or the cell identity of the source cell, for example the cell identity of 3G cell 4.

Step 603: when the UE has an access back to a RAT-2 cell, for example the UE sets up a RRC connection in RAT-2 cell 3 or hands over to RAT-2 cell 3, the UE indicates the base station that the UE has RLF report information in a RRC connection setup request, a RRC connection setup complete, a RRC connection re-establishment request, a RRC connection re-establishment complete, a handover complete, a RRC connection reconfiguration complete or other RRC message.

Step 604: base station 3 requests the UE to report the RLF report information.

Step 605: the UE sends the stored RLF report to base station 3. Content of the UE RLF report is the same as that of step 303, which is not described repeatedly here.

Here, there are two methods for RAT-2 to detect the reason of the RLF or the handover failure. Method 1 is that the base station of the cell which receives the RLF report determines the failure reason as that of step 606 and step 607. Method 2 is that the base station of the cell which receives the RLF report sends the RLF report to the base station of the cell where the RLF occurs, the base station of the cell where the RLF occurs determines the failure reason, as that of step 608 and step 609.

Steps 606 to 609 are the same as steps from step 506 to 509 respectively, which is not described repeatedly here.

Up to now, the whole work flow of the UE reporting RLF information and the base station detecting failure reason according to embodiment 2 of method 1 of the present invention is finished.

Figure 7:
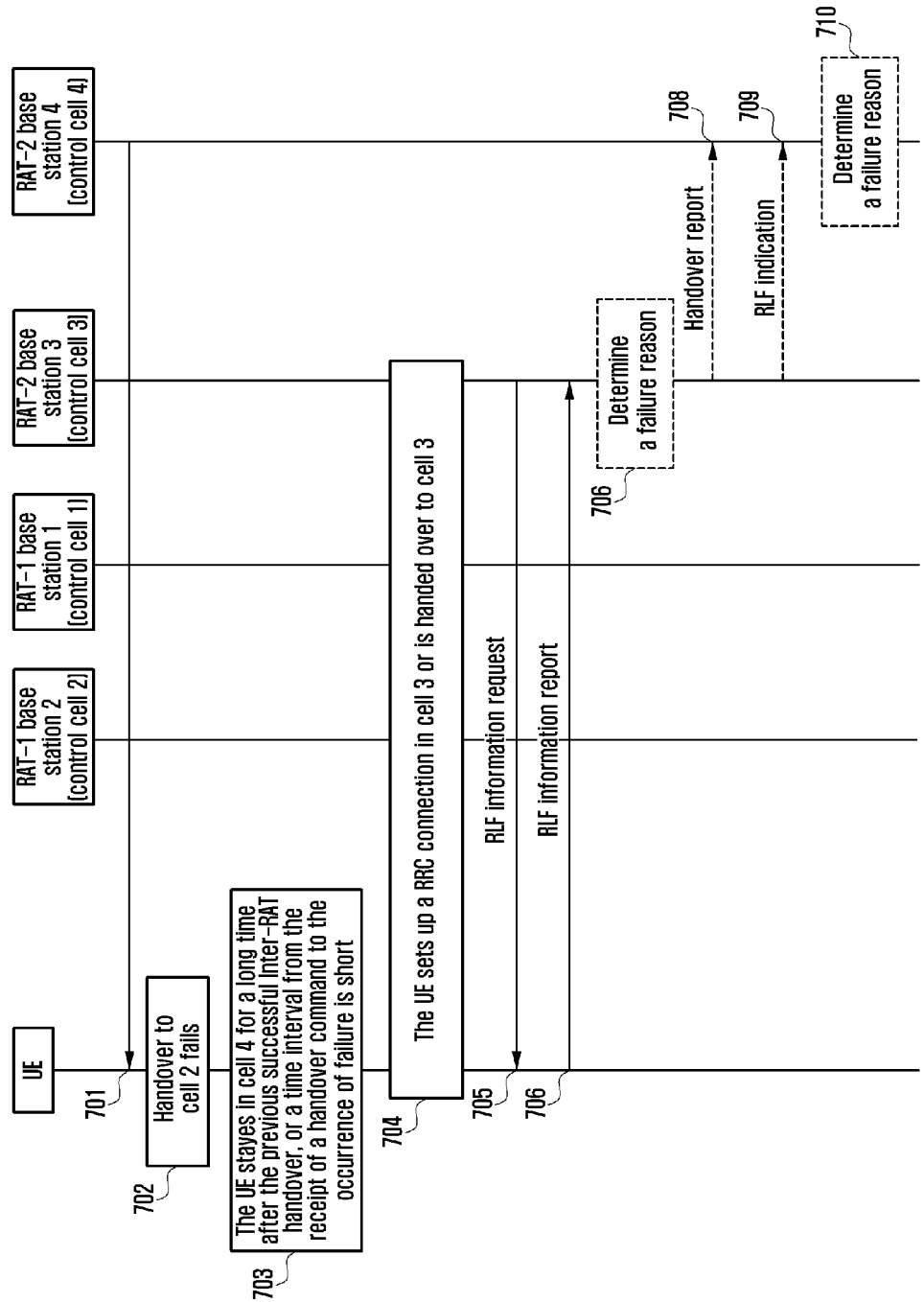
FIG. 7 is a flow chart illustrating a process of a UE reporting RLF information and a base station detecting failure reason according to embodiment 3 of method 1 of the present invention.

FIG. 7 is a flow chart illustrating a process of a UE reporting RLF information and a base station detecting failure reason according to embodiment 3 of method 1 of the present invention. For example, the embodiment can be used in the following scenario: a 3G RNC4 hands over the UE from cell 4 to cell 1 of LTE base station 1, handover failure occurs during a process of handover, a UE has an access back to 3G cell 3. As illustrated in FIG. 7, the process includes:

Step 701: RAT-2 base station 4 sends a handover command to the UE, hands over the UE from cell 4 to RAT-1 cell 2.

Step 702: the handover fails. For example, a RACH process for the UE to access a target cell fails.

Step 703: since the UE has stayed in cell 4 for a long time after previous successful Inter-RAT handover, the UE records a RAT type of RAT-2 and/or an identity of cell 4 of RAT2, and when the UE accesses a cell of RAT-2, a UE RLF report is sent to a base station of RAT-2. Or, the UE decides a time length according to the comparison between a time interval from the receipt of a handover command of previous Inter-RAT handover to the occurrence of the failure, and a fixed clock value, and if the time length is short, the UE sends the RLF report to a source access system where Inter-RAT handover is triggered, i.e. RAT-2. The UE records the type of the source access system of the previous Inter-RAT handover i.e. RAT-2 and/or the cell identity of RAT2 cell 4. Thus, for the handover failure during a process of the Inter-RAT handover process, it is possible according to the previous successful handover or the handover process to be processing, which can be corresponded to the source access system and the target access system for the current handover. In the scenario, all can be corresponded to RAT-2.

Step 704: when the UE has an access back to the RAT-2 cell, for example the UE sets up a RRC connection in RAT-2 cell 3 or is handed over to RAT-2 cell 3, the UE indicates a base station that the UE has RLF report information in a RRC connection setup request, a RRC connection setup complete, a RRC connection re-establishment request, a RRC connection re-establishment complete, a handover complete, a RRC connection reconfiguration complete or other RRC message.

Step 705: base station 3 requests the UE to report the RLF report information.

Step 706: the UE sends the stored RLF report to the base station. Content of the UE RLF report is the same as that of step 303, which is not described repeatedly here.

Here, there are two methods to detect a reason of the RLF or the handover failure. Method 1 is the base station of the cell which receives the RLF report decides the reason which leads the failure occurs on the UE, as that of step 707 and step 708. Method 2 is the base station of the cell which receives the RLF report sends the RLF report to the base station of the cell where the UE stays when the RLF or the handover failure occurs, the base station of the cell where the UE stays when the RLF or the handover failure occurs decides the failure reason, as that of step 709 and step 710.

Steps 707 to 710 are the same as steps from step 506 to 509 respectively, which is not described repeatedly here.

So far, the whole work flow of the UE reporting RLF information and the base station detecting failure reason provided in embodiment 3 of method 1 of the present invention is finished.

Figure 8:
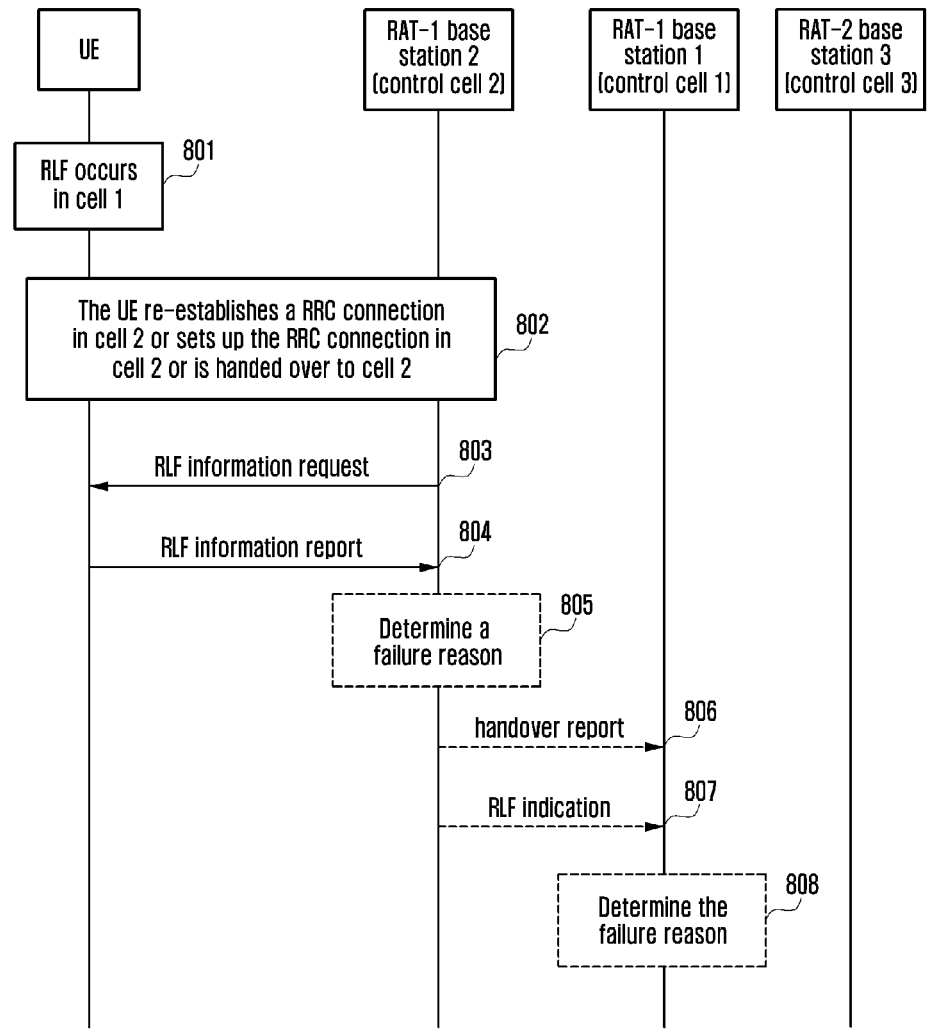
FIG. 8 is a flow chart illustrating a process of a UE reporting RLF information and a base station detecting failure reason according to embodiment 1 of method 2 of the present invention.

FIG. 8 is a flow chart illustrating a process of a UE reporting RLF information and a base station detecting failure reason according to embodiment 1 of method 2 of the present invention. For example the embodiment can be used in the following scenario: handover is too late from LTE to 3G, RLF occurs on the UE in LTE cell 1, when the UE has an access back to an LTE cell, for example the UE accesses cell 2 or is handed over to cell 2, the UE sends stored RLF report information to a base station of cell 2. Here, after the UE accesses cell 1, then the RLF occurs, the UE can access 3G cell 3, then UE has an access back to LTE cell 2, or is handed over to LTE cell 2. As illustrated in FIG. 8, the process includes:

Step 801: the RLF occurs in cell 1, cell 1 is controlled by a RAT-1 base station.

Step 802: when the UE has the access back to a RAT-1 cell, for example the UE sets up a RRC connection or is handed over to RAT-1 cell 2, the UE indicates the base station that the UE has RLF report information in a RRC connection setup request, a RRC connection setup complete, a RRC connection re-establishment request, a RRC connection re-establishment complete, a handover complete, a RRC connection reconfiguration complete or other RRC message.

Step 803: base station 2 requests the UE to report the RLF report information.

Step 804: the UE sends the stored RLF report to base station 2. Content of the UE RLF report is the same as that of step 303, which is not described repeatedly here.

Here, there are two methods for RAT-1 to detect a reason of the RLF or the handover failure. Method 1 is the base station of the cell receiving the RLF report determines the reason which leads the failure occurs on the UE, as that of step 805 and step 806. Method 2 is the base station of the cell receiving the RLF report sends the RLF report to the base station of the cell where the RLF occurs, the base station of the cell where RLF occurs determines the reason, as that of step 807 and step 808.

Steps 805 to 808 are the same as steps from step 506 to 509 respectively, which is not described repeatedly here.

So far, the whole work flow of the UE reporting RLF information and the base station detecting failure reason provided in embodiment 1 of method 2 of the present invention is finished.

Figure 9:
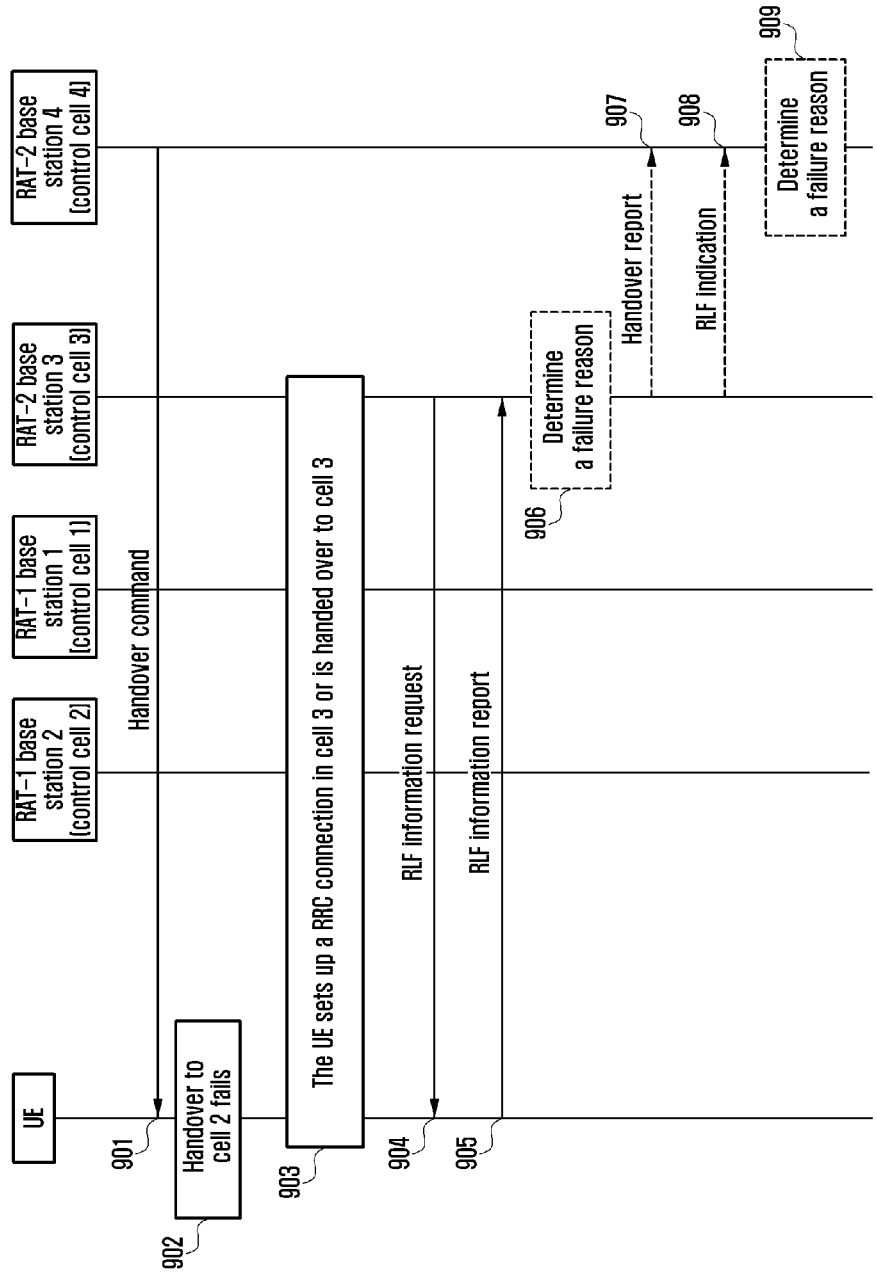
FIG. 9 is a flow chart illustrating a process of a UE reporting RLF information and a base station detecting failure reason according to embodiment 2 of method 2 of the present invention.

FIG. 9 is a flow chart illustrating a process of a UE reporting RLF information and a base station detecting failure reason according to embodiment 2 of method 2 of the present invention. For example the embodiment can be used in the following scenario: 3G RNC4 hands over the UE from cell 4 to cell 1 of LTE base station 1, handover failure occurs during a process of a handover, the UE has an access back to 3G cell 3. As illustrated in FIG. 9, the process includes:

Step 901: RAT-2 base station 4 sends a handover command to the UE, hands over the UE from cell 4 to RAT-1 cell 2.

Step 902: handover fails. For example, a RACH process for the UE to access a target cell fails.

Step 903: when the UE has the access back to RAT-2 cell, for example, the UE sets up a RRC connection in RAT-2 cell 3, or is handed over to RAT-2 cell 3, the UE indicates a base station that the UE has RLF report information in a RRC connection setup request, a RRC connection setup complete, a RRC connection re-establishment request, a RRC connection re-establishment complete, a handover complete, a RRC connection reconfiguration complete or other RRC message.

Step 904: base station 3 requests the UE to report the RLF report information.

Step 905: the UE sends the stored RLF report to base station 3. Content of the UE RLF report is the same as that of step 303, which is not described repeatedly here.

Here, there are two methods for RAT-2 to detect a reason of RLF or handover failure. Method 1 is the base station of the cell receiving the RLF report determines the reason which leads that the failure occurs on the UE, as that of step 906 and 907. Method 2 is the base station of the cell receiving the RLF report sends the RLF report to the base station of the cell where the RLF or the handover failure occurs on the UE, the base station of the cell where the RLF or the handover failure occurs on the UE determines the failure reason, as that of step 908 and step 909.

Steps 906 to 909 are the same as steps from step 506 to 509 respectively, which is not described repeatedly here.

So far, the whole work flow of the UE reporting RLF information and the base station detecting failure reason provided in embodiment 2 of method 2 of the present invention is finished.

Figure 10:
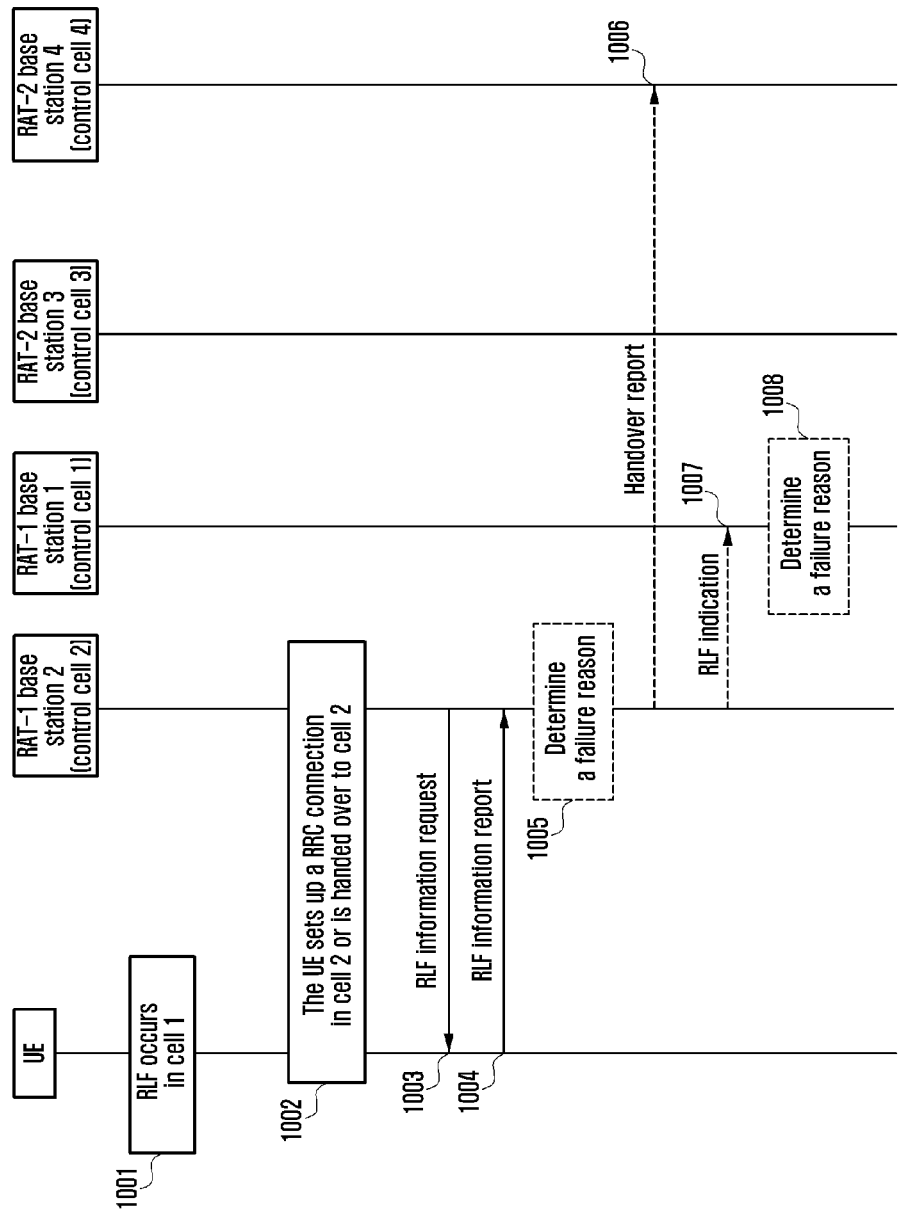
FIG. 10 is a flow chart illustrating a process of a UE reporting RLF information and a base station detecting failure reason according to embodiment 3 of method 2 of the present invention.

FIG. 10 is a flow chart illustrating a process of a UE reporting RLF information and a base station detecting failure reason according to embodiment 3 of method 2 of the present invention. For example the embodiment can be used in the following scenario: 3G RNC 4 hands over the UE from cell 4 to cell 1 of LTE base station 1. After a handover is recently completed, the UE has an access back to 3G cell 3. As illustrated in FIG. 10, the process includes:

Step 1001: RLF occurs on the UE in cell 1, cell 1 is controlled by RAT-1 base station 1.

The UE stores an access system type of a source access system of previous Inter-RAT handover and/or a cell identity of a source cell of the previous Inter-RAT handover. If a cell where the UE receives a handover command at the last time is a UTMS cell, an LAI of a Location Area to which the cell belongs and an RAC of a Router Area to which the cell belongs to can be further stored. If the cell is an LTE cell, a TAI of a Tracking Area to which the cell belongs is further stored.

The UE stores the cell identity of a failure cell. For handover failure, a global cell identity of a handover target cell or a physical cell identity and frequency of a handover target cell is set as the cell identity of the failure cell. For the RLF, the global cell identity of the cell where the RLF occurs or the physical cell identity and the frequency of the cell where the RLF occurs is set as the cell identity of the failure cell.

The UE stores the cell identity and/or the RAT type of the cell where the UE attempts RRC reestablishment or the RRC connection setup at the first time after the failure.

The UE stores a time interval from the receipt of a handover command message at the last time to the occurrence of RLF or handover failure.

Step 1002: for the RLF, the UE report a RLF report to a RAT where the RLF occurs, i.e. RAT-1. When the UE has the access back to a RAT-1 cell, for example the UE sets up the RRC connection or is handed over to RAT-1 cell 2, the UE indicates the base station that the UE has RLF report information in a RRC connection setup request, a RRC connection setup complete, a RRC connection re-establishment request, a RRC connection re-establishment complete, a handover complete, a RRC connection reconfiguration complete or other RRC message.

Step 1003: base station 2 requests the UE to report the RLF report information.

Step 1004: the UE sends the stored RLF report to base station 2. Content of the UE RLF report is the same as that of step 303, which is not described repeatedly here.

Here, there are two methods for RAT-1 to detect a reason of the RLF or the handover failure. Method 1 is the base station of the cell receiving the RLF report detects the reason which leads that the failure occurs on the UE, as that of step 1005 and step 1006. Method 2 is the base station of the cell receiving the RLF report sends the RLF report to the base station of the cell where the RLF occurs, the base station of the cell where the RLF occurs determines the reason of the failure, as that of step 1007 and step 1008.

Step 1005 is the same as step 506, which is not described repeatedly here.

Step 1006: if the reason is too late Inter-RAT handover, RAT-1 base station 2 sends a handover report to the base station of the cell where RLF occurs on the UE. If the reason is too early Inter-RAT handover, handover to an wrong RAT, or handover to an wrong cell, RAT-1 base station 2 sends the handover report to the base station where the handover is triggered at the last time. The handover report message includes the cell identity of the cell where the RLF occurs and a failure reason, for example too early Inter-RAT handover, too late Inter-RAT handover, handover to the wrong RAT or handover to the wrong cell. The handover report includes the cell identity of the target cell for the handover at the last time and/or the RAT type of the RAT to which the cell belongs, the cell identity of the source cell for the handover at the last time and/or the RAT type of the RAT to which the cell belongs, the cell identity of the cell where the UE attempts RRC reestablishment or the RRC connection setup at the first time after the failure and/or the RAT type of the RAT to which the cell where the UE attempts RRC reestablishment or the RRC connection setup at the first time after the failure belongs.

If the reason of the RLF or the handover failure is a coverage hole, the base station sends a coverage problem report to the base station of the cell lastly serving the UE before a connection fails, the coverage problem report includes the global cell identity of the cell lastly serving the UE.

If RAT-1 base station 2 and the base station which needs to receive the handover report belongs to different RATs, the handover report need to be sent to the base station where the handover is lastly triggered, i.e. RAT-2 base station 4 for too early Inter-RAT handover, handover to the wrong RAT or handover to the wrong cell, if base station 2 and base station 4 belongs to different RATs, the handover report is forwarded to a target base station via a core network. The handover report includes the cell identity of the cell where the handover is triggered at the last time, and/or an LAI of a Location Area to which the cell belongs and an RAC of a Router Area to which the cell belongs (if the cell is an LTE cell, a TAI of a Tracking Area to which the cell belongs to is included). If the cell is a UMTS cell, the handover report can further include an identity of an RNC. For too late Inter-RAT handover, RAT-1 base station 2 sends the handover report to the cell where the UE locates when the RLF occurs, if the base station and base station 2 belongs to different RATs, the handover report is forwarded to the target base station via the core network. The handover report includes the cell identity of the cell where the UE locates when the RLF occurs, and/or the LAI of the Location Area to which the cell belongs and the RAC of the Router Area to which the cell belongs (if the cell is an LTE cell, the TAI of the Tracking Area to which the cell belongs to is included).

Steps 1007 to 1008 are the same as steps from step 508 to 509 respectively, which is not described repeatedly here.

So far, the whole work flow of the UE reporting RLF information and the base station detecting failure reason provided in embodiment 3 of method 2 of the present invention is finished.

It can be seen from the above technical scheme, the main effect given by the present invention for reporting RLF information is, by sending RLF reporting including information of RLF or handover failure to an access system to which a cell which lead to a problem belongs to, the access system can correctly determine the reason of the RLF or handover failure according to the received RLF report. Furthermore, the access system can perform the correct self-optimization for the mobile communication system according to the detected reason. The performance of the mobile communication system is improved. Moreover, according to the technical scheme of the present invention, adverse effect for the other RAT is avoided. It is guaranteed that a problem of a RAT is solved in the RAT. Signaling interaction is reduced between different RATs (Inter-RAT). Performance of the mobile communication system is improved.

The above described is only preferred embodiments of the present invention, and not used to limit the present invention. Any changes, equivalent substitution, improvement, etc., within the spirit and principles of the present invention should be included in the protection scope of the present invention.

The invention claimed is:

1. A method for reporting radio link failure (RLF) information, the method comprising:
   identifying, by a user equipment (UE), a failure occurring on the UE, wherein the failure comprises RLF or handover failure;
   determining an access system for transmitting a RLF report based on a time interval from receiving a handover command message of a previous inter radio access technology (Inter-RAT) handover to the failure;
   transmitting, by the UE, the RLF report to a source access system of previous Inter-RAT handover if the interval is less than or equal to a predefined period of time; and
   transmitting, by the UE, the RLF report to a target access system of the previous Inter-RAT handover if the interval is greater than the predefined period of time.

2. The method of claim 1, wherein:
   for the RLF, the previous Inter-RAT handover comprises a previous successful Inter-RAT handover, the source access system comprises an access system of a source cell for the previous successful Inter-RAT handover, and the target access system comprises an access system of a target cell for the previous successful Inter-RAT handover; and for the handover failure,
the previous Inter-RAT handover comprises a previous successful Inter-RAT handover, the source access system comprises an access system of a source cell for the previous successful Inter-RAT handover, and the target access system comprises an access system of a target cell for the previous successful Inter-RAT handover; or
the previous Inter-RAT handover comprises an Inter-RAT handover at a last time, the source access system comprises an access system of a source cell for the Inter-RAT handover at the last time, and the target access system comprises an access system of a target cell for the Inter-RAT handover at the last time.

3. The method of claim 1, further comprising:
indicating, by the UE, to a network that the UE has RLF report information during a handover process or a process of radio resource control (RRC) connection setup.

4. The method of claim 1, wherein:
the RLF report comprises:
at least one of a cell identity or a RAT type of a cell lastly serving the UE when the RLF occurs, or
at least one of a cell identity or a RAT type of a target cell when the handover failure occurs; and
the RLF report further comprises:
at least one of a cell identity or a RAT type of a cell where the UE attempts radio resource control (RRC) reestablishment or a RRC connection setup at a first time after the failure, and
at least one of a cell identity or a RAT type of a cell where the UE locates before the UE is handed over a failure cell;
wherein the cell identity comprises: a global cell identity (CGI/ECGI) or a physical cell identity (PCI) and frequency information.

5. The method of claim 4, further comprising:
determining, by a base station of the access system by which the RLF report is received, a failure reason according to the RLF report;
wherein the failure reason is one of: handover to an wrong cell, too early Inter-RAT handover, too late Inter-RAT handover, handover to an wrong RAT, or a coverage hole.

6. The method of claim 5, further comprising:
transmitting, by the base station, a handover report to a cell where the handover is triggered at the last time, if the failure reason is handover to an wrong cell, too early Inter-RAT handover, handover to an wrong RAT and the base station is not the base station of the cell where the handover is triggered; and
transmitting, by the base station, the handover report to the base station of the cell which served the UE before the failure, if the failure reason is too late Inter-RAT handover, and the base station is not the base station serving the UE before the failure.

7. The method of claim 1, further comprising:
storing, by the UE, after the failure occurs on the UE, at least one of:
a cell identity of a failure cell;
for the handover failure, the cell identity of the failure cell is a global cell identity or a physical cell identity and a frequency of a target cell for the handover,
for the RLF, the cell identity of the failure cell is a global cell identity or a physical cell identity and a frequency of the cell where the RLF occurs;
a previous cell identity, the previous cell identity being a global cell identity or a physical cell identity and a frequency of a cell from which the UE receives a handover command message at a last time before the failure; if the cell from which the UE receives the handover command message at the last time before the failure is a UMTS cell, optionally storing a Location Area Identity (LAI) of a Location Area to which the cell belongs, a Router Area Code (RAC) of a Router Area to which the cell belongs, if the cell from which the UE receives the handover command message at the last time before the failure is an LTE cell, optionally storing a Tracking Area Identity (TAI) of a Tracking Area to which the cell belongs;
at least one of a cell identity or a RAT type of a cell where the UE attempts RRC reestablishment or a radio resource control (RRC) connection setup at a first time after the failure; or
the time interval from receipt of the handover command message at a last time to occurrence of the RLF or the handover failure.

8. A user equipment (UE) for reporting radio link failure (RLF) information, the UE comprising:
a transceiver configured to transmit and receive a signal; and
a controller configured to:
identify, by the UE, a failure occurring on the UE, wherein the failure comprises RLF or handover failure,
determine, by the UE, an access system for transmitting a RLF report based on a time interval from receiving a handover command message of a previous inter radio access technology (Inter-RAT) handover to the failure,
transmit, by the UE, the RLF report to a source access system of previous Inter-RAT handover if the interval is less than or equal to the predefined period of time, and
transmit, by the UE, the RLF report to a target access system of the previous Inter-RAT handover if the interval is greater than the predefined period of time.

9. The UE of claim 8, wherein:
for the RLF, the previous Inter-RAT handover comprises a previous successful Inter-RAT handover, the source access system comprises an access system of a source cell for the previous successful Inter-RAT handover, and the target access system comprises an access system of a target cell for the previous successful Inter-RAT handover; and
for the handover failure,
the previous Inter-RAT handover comprises a previous successful Inter-RAT handover, the source access system comprises an access system of a source cell for the previous successful Inter-RAT handover, and the target access system comprises an access system of a target cell for the previous successful Inter-RAT handover; or
the previous Inter-RAT handover comprises an Inter-RAT handover at a last time, the source access system comprises an access system of a source cell for the Inter-RAT handover at the last time, and the target access system comprises an access system of a target cell for the Inter-RAT handover at the last time.

10. The UE of claim 8, wherein the controller is further configured to indicate to a network that the UE has RLF report information during a handover process or a process of radio resource control (RRC) connection setup.

11. The UE of claim 8, wherein:
the RLF report comprises:
at least one of a cell identity or a RAT type of a cell lastly serving the UE when the RLF occurs, or
at least one of a cell identity or a RAT type of a target cell when the handover failure occurs; and
the RLF report further comprises:
at least one of a cell identity or a RAT type of a cell where the UE attempts radio resource control (RRC) reestablishment or a RRC connection setup at a first time after the failure, and
at least one of a cell identity or a RAT type of a cell where the UE locates before the UE is handed over a failure cell;
wherein the cell identity comprises: a global cell identity (CGI/ECGI) or a physical cell identity (PCI) and frequency information.

12. The UE of claim 11, wherein a base station, of the access system by which the RLF report is received, determines a failure reason according to the RLF report;
wherein the failure reason is one of: handover to an wrong cell, too early Inter-RAT handover, too late Inter-RAT handover, handover to an wrong RAT, or a coverage hole.

13. The UE of claim 12, further comprising:
transmitting, by the base station, a handover report to a cell where the handover is triggered at the last time, if the failure reason is handover to an wrong cell, too early Inter-RAT handover, handover to an wrong RAT and the base station is not the base station of the cell where the handover is triggered; and
transmitting, by the base station, the handover report to the base station of the cell which served the UE before the failure, if the failure reason is too late Inter-RAT handover, and the base station is not the base station serving the UE before the failure.

14. The UE of claim 8, wherein the controller is further configured to store, after the failure occurs on the UE, at least one of:
a cell identity of a failure cell;
for the handover failure, the cell identity of the failure cell is a global cell identity or a physical cell identity and a frequency of a target cell for the handover,
for the RLF, the cell identity of the failure cell is a global cell identity or a physical cell identity and a frequency of the cell where the RLF occurs;
a previous cell identity, the previous cell identity being a global cell identity or a physical cell identity and a frequency of a cell from which the UE receives a handover command message at a last time before the failure; if the cell from which the UE receives the handover command message at the last time before the failure is a UMTS cell, optionally storing a Location Area Identity (LAI) of a Location Area to which the cell belongs, a Router Area Code (RAC) of a Router Area to which the cell belongs, if the cell from which the UE receives the handover command message at the last time before the failure is an LTE cell, optionally storing a Tracking Area Identity (TAI) of a Tracking Area to which the cell belongs;
at least one of a cell identity or a RAT type of a cell where the UE attempts RRC reestablishment or a radio resource control (RRC) connection setup at a first time after the failure; or
the time interval from receipt of the handover command message at a last time to occurrence of the RLF or the handover failure.

* * * * *